(12) United States Patent
Nagel

(10) Patent No.: US 6,901,190 B1
(45) Date of Patent: May 31, 2005

(54) FAULT TOLERANT OPTICAL AMPLIFIER CONFIGURATION USING PUMP FEEDTHROUGH

(75) Inventor: Jonathan A. Nagel, Brooklyn, NY (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 1 day.

(21) Appl. No.: 10/057,666

(22) Filed: Jan. 25, 2002

Related U.S. Application Data

(60) Provisional application No. 60/263,982, filed on Jan. 25, 2001.

(51) Int. Cl.[7] .............................. G02B 6/26; H01S 5/50
(52) U.S. Cl. ....................... 385/42; 385/27; 359/341.3; 359/341.32
(58) Field of Search .......................... 359/341.1–341.3, 359/341.44, 341.32; 385/15, 24, 27, 31, 41, 42

(56) References Cited

U.S. PATENT DOCUMENTS

| | | | |
|---|---|---|---|
| 5,058,974 A | * 10/1991 | Mollenauer | ................. 385/27 |
| 5,173,957 A | 12/1992 | Bergano et al. | |
| 5,241,414 A | 8/1993 | Giles et al. | |
| 5,815,308 A | * 9/1998 | Kim et al. | ................ 359/341.2 |
| 5,912,761 A | 6/1999 | Jander et al. | |
| 5,991,070 A | 11/1999 | Zanoni et al. | ......... 359/341.33 |
| 6,101,025 A | 8/2000 | Naganuma | ............. 359/341.33 |
| 6,542,290 B1 | * 4/2003 | Nakano | ................. 359/341.32 |
| 6,583,925 B1 | * 6/2003 | Delavaux et al. | ...... 359/341.32 |
| 2002/0176155 A1 | * 11/2002 | Islam | ...................... 359/341.1 |

* cited by examiner

*Primary Examiner*—John D. Lee
(74) *Attorney, Agent, or Firm*—Grossman, Tucker, Perreault & Pfleger, PLLC

(57) ABSTRACT

A method and apparatus for amplifying optical transmission signals is described. A bi-directional amplifier utilizes a pump feed-through signal from one of the optical pumps used to pump a first amplifying fiber to provide pump power to a second amplifying fiber. If an optical pump within the amplifier fails, this feed-through signal is used to pump the amplifying fiber directly pumped by the failed pump source.

11 Claims, 2 Drawing Sheets

FAULT TOLERANT OPTICAL AMPLIFIER CONFIGURATION USING PUMP FEEDTHROUGH

CROSS REFERENCE TO RELATED APPLICATION

The present application claims the benefit of U.S. Provisional Application Ser. No. 60/263,982, filed Jan. 25, 2001, entitled "Fault Tolerant Optical Amplifier Configuration Using Pump Feedthrough", the teachings of which are incorporated herein by reference.

FIELD OF THE INVENTION

The present invention relates generally to optical fiber amplifiers and more particularly to optical fiber amplifiers having an optical pump fault tolerant capability using an optical pump feed-through configuration.

BACKGROUND OF THE INVENTION

Optical fiber amplifiers have been employed in telecommunication systems to amplify light transmission signals. Optical amplifiers, and more particularly erbium doped fiber amplifiers, are attractive for telecommunications systems for a number of reasons including wavelength independence and bit rate transparency.

Optical amplifiers are disposed along the transmission path of an optical communication system. These amplifiers include at least an amplifying fiber, a coupler, and a pump source used to excite the amplifying fiber. The amplifying fiber is doped with a rare earth element (e.g. erbium) that is excited by light emitted from the pump source to amplify the signals propagating through the amplifying fiber. The pump light usually has a wavelength of 980 or 1480 nm. When a transmission signal, using having a wavelength in the 1550 nm range, propagates through the amplifying fiber, this light stimulates the erbium atoms to release their stored energy as additional 1550 nm light waves which continues as the transmission signals propagates through the amplifying fiber.

Optical amplifiers are attractive because they exhibit low noise, provide a relatively large bandwidth, which is not polarization dependent, and provide low insertion loses at the transmission signal operating wavelengths in the 1550 nm range. The pump light used to excite the amplifying fiber can be configured to co-propagate or counter-propagate with respect to the direction of propagation of the transmission signal. The couplers used to provide the pump light to the amplifying fiber have a high coupling ratio at the pump wavelength and a low coupling ratio at the signal wavelength.

Within an optical communication system, amplifiers are normally configured in pairs, since the optical transmission signals are bi-directional. Because of this, the pump sources are shared among the amplifiers in both directions. These pump sources are the only active component in the amplifier and are usually the most expensive. In telecommunication systems where high reliability is a requirement, for example in undersea systems, redundant pump configurations are necessary to compensate for pump failures. However, some redundant configurations employ additional pump sources that increase costs and power requirements.

Accordingly, there is a need for a fault tolerant amplifier configuration that employs optical pump sources capable of compensating for failed pumps in either signal transmission direction.

SUMMARY OF THE INVENTION

One embodiment of the invention comprises a method and apparatus that provides a fault tolerant pump source configuration in an optical amplifier. A first pump source supplies pump power to a first amplifying fiber segment for amplifying transmission signals propagating through the first fiber segment in a first direction. A second pump source supplies pump power to a second amplifying fiber segment for amplifying transmission signals propagating through the second fiber segment in a second direction. A portion of the pump signal supplied to the first amplifying fiber segment remains after propagation through the first fiber segment. This remaining feed-through signal is supplied to a second amplifying fiber segment and amplifies the transmission signals propagating through the second amplifying fiber. Likewise, a portion of the pump signal supplied to the second amplifying fiber segment remains after propagation through the second fiber segment. This remaining feed-through signal is supplied to the first amplifying fiber segment and amplifies transmission signals propagating through the first amplifying fiber. When a pump source fails, the remaining operating pump directly pumps its associated amplifying fiber segment and its feed-through signal pumps the other amplifying fiber segment associated with the failed pump source. This feed-through architecture alleviates the need for additional pump sources for pump redundancy purposes in high reliability communication systems.

With these and other advantages and features of the invention that will become hereinafter apparent, the nature of the invention may be more clearly understood by reference to the following detailed description of the invention, the appended claims and to the several drawings attached herein.

DETAILED DESCRIPTION

Figure 1:
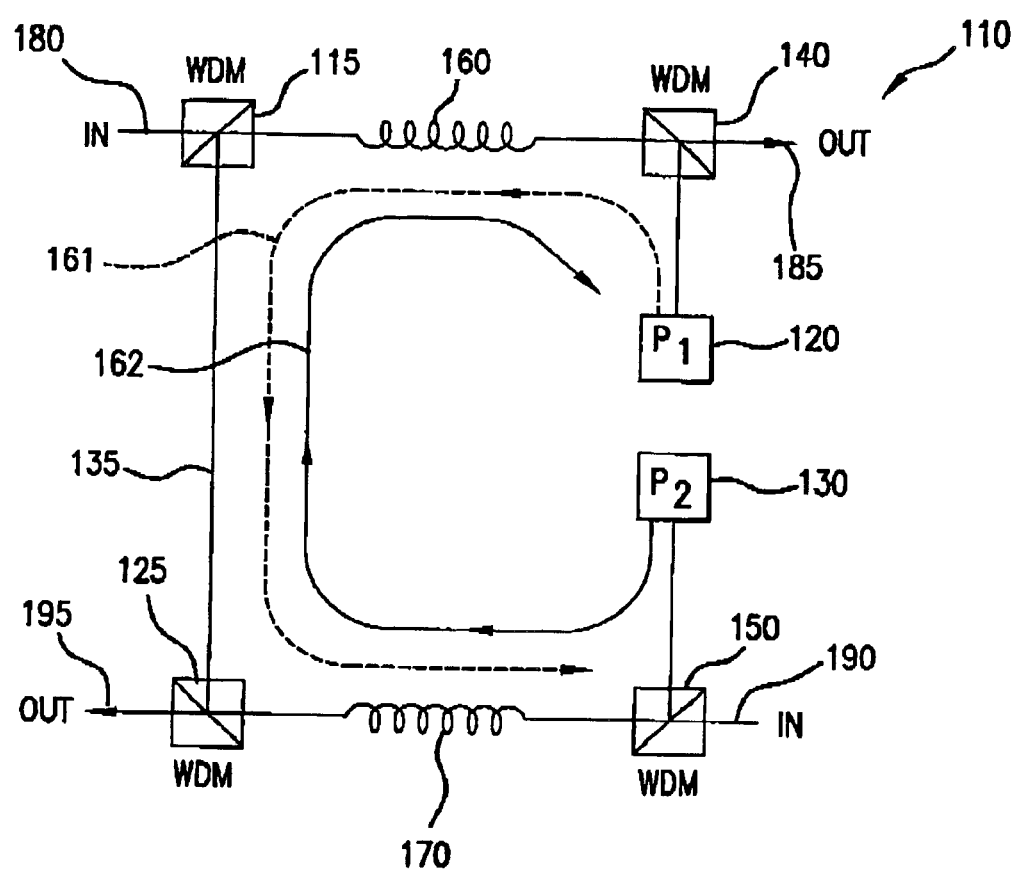
FIG. 1 is a schematic illustration of an amplifier pair employing two optical pump sources in accordance with the present invention.

FIG. 1 schematically illustrates an exemplary configuration for amplifier pair 110 for use within an optical communication system or network. Amplifier pair 110 may be one of a plurality of amplifiers disposed along a transmission path. The amplifier pair is configured to amplify transmission signals carrying communications traffic in two directions; from input port 180 to output port 185 and from input port 190 to output port 195 (e.g. East to West and West to East). A first amplifier comprises a light pump source 120, wavelength discriminating coupler 140 (WDM coupler) and amplifying fiber segment 160. A second amplifier includes light pump source 130, wavelength discriminating coupler 150 and amplifying fiber segment 170.

The first amplifier amplifies light entering port 180 and outputted via port 185 and the second amplifier amplifies light entering port 190 and outputted via port 195. Fiber segments 160 and 170 are doped with a rare earth element, such as erbium, that, when excited by light emitted from pump source 120 or 130 amplifies transmission signals entering each amplifier via ports 180 and 190 respectively. Pump sources 120 and 130 can be, for example, laser light sources providing light having wavelengths of 980 or 1480 nm. In the exemplary embodiment shown in FIG. 1, the light signal from pump 120 is supplied to fiber segment 160 via directional coupler 140 in a counter propagating manner with respect to the propagation of the transmission signals as indicated by directional arrows 161 and the light from pump source 130 is supplied to fiber segment 170 via directional coupler 150 in a co-propagating manner as indicated by the directional arrows 162. Coupler 140 is disposed between pump source 120 and amplifying fiber segment 160 and is configured to have an input port that receives the pump signal from pump 120 and supplies it to amplifying fiber 160. Likewise, coupler 150 is disposed between pump source 130 and amplifying fiber segment 170 and is configured to have an input port that receives the pump signal from pump 130 and outputs it to amplifying fiber 170. Couplers 140 and 150 have high coupling ratios at the pump wavelength and low coupling ratios at the transmission signal wavelength. In other words, the couplers 140 and 150 couple light from the pump sources 120 and 130 (e.g. having wavelengths in the 980 nm range or 1480 nm range) to the respective amplifying fibers 160 and 170, while supplying the transmission signals (e.g. having wavelengths in the 1550 nm range) from amplifying fiber 160 to output port 185 and from amplifying fiber 170 to output port 190. Accordingly, each pump 120 and 130 provides light at a particular wavelength sufficient to excite the rare earth elements in fiber segments 160 and 170. In this manner, the amplifier pair is configured to amplify signals traversing a communication system bi-directionally; i.e. East to West via ports 180 and 185; and West to East via ports 190 and 195.

After the light from pump 120 propagates through amplifying fiber segment 160, a portion of the pump light signal still remains ("pump feed-through signal"). An additional directional or WDM coupler 115 disposed between input port 180 and amplifying fiber segment 160 is used to couple the pump feed-through signal to WDM coupler 125 disposed between output port 195 and amplifying fiber 170 via a bi-directional connection 135 which may be, for example, a fiber jumper. Again, coupler 125 has a high coupling ratio at the pump wavelength and a low coupling ratio at the signal wavelength. This pump feed-through signal supplied to fiber segment 170 via coupler 125 pumps amplifying fiber segment 170 in a counter-propagating manner as shown by directional arrow 161. Thus, amplifying fiber segment 170 is pumped twice, once from its primary pump 130 and once from the pump feed-through signal from fiber segment 160 and pump 120.

Similarly, after the light from pump 130 propagates through amplifying fiber segment 170, a portion of the pump light signal still remains as a pump feed-through signal. This pump feed-through signal is supplied in a co-propagating manner to fiber segment 160 via WDM couplers 125, 115 and bi-directional connection 135. Thus, amplifying fiber segment 160 is pumped twice, once from its primary pump 120 in a counter-propagating direction and once from the pump feed-through signal from fiber segment 170 and pump 130 in a co-propagating direction.

If a pump 120 or 130 should fail, one of the amplifying fiber segments 160, 170 would lose its primary pump, but would still receive pump light from the remaining functioning pump via the feed-through signal. For example, if pump 130 fails, amplifying fiber segment 160 is pumped by pump 120 directly in a counter-propagating direction, and fiber segment 170 is pumped by pump 120 by the feed-through signal from pump 120 via couplers 115, 125 and bi-directional connection 135 also in a counter-propagating direction. Similarly, if pump 120 fails, amplifying fiber segment 170 is pumped directly by pump 130 in a co-propagating direction and fiber segment 160 is pumped by the remaining feed-through signal from pump 130 via couplers 125, 115 and bi-directional connection 135 in a co-propagating direction Obviously, the pumps can be configured such that the direction of the primary pump light is either co-propagating or counter propagating and the feed-through signal is either counter propagating or co-propagating. This choice may also be dependent on the desired gain profile of the respective amplifier or amplifier pair within the transmission system. In addition, if this amplifier configuration is used as a pre-amplifier, each amplifying fiber segment is not highly saturated and therefore relatively strong pump feed-through signal will be present sufficient to pump the remaining amplifying fiber segment.

Figure 2:
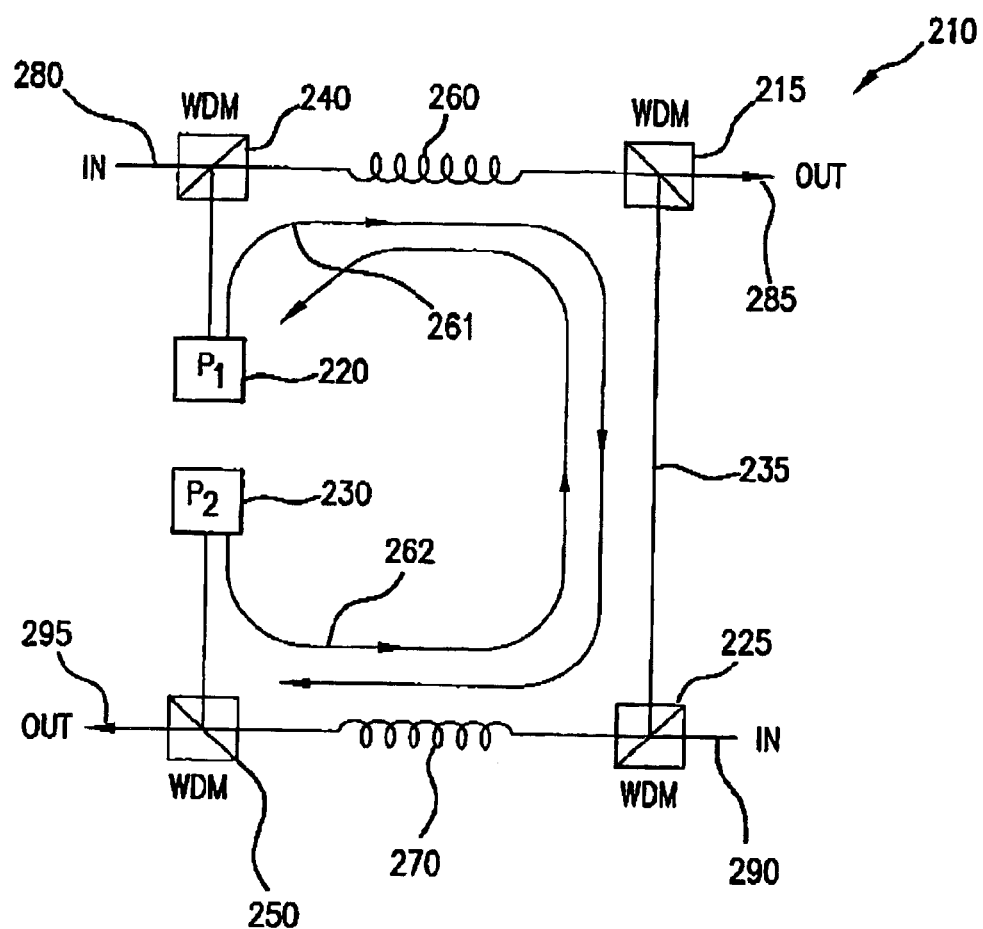
FIG. 2 is an alternative embodiment of an amplifier pair employing two optical pump sources in accordance with the present invention.

FIG. 2 illustrates an alternative configuration for amplifier pair 210 for use within an optical communication system. Transmission signals enter input port 280 propagate through amplifying fiber segment 260 and exit via output port 285. Likewise, transmission signals enter input port 290, propagate through amplifying fiber segment 270 and exit via output port 295. A first pump source 220 supplies pump light in a co-propagating manner to amplifying fiber segment 260 via WDM coupler 240. Pump source 230 supplies pump light in a counter-propagating manner to fiber segment 270 via WDM coupler 250.

After the light from pump 220 propagates through amplifying fiber segment 260, a portion of the pump light signal still remains ("pump feed-through signal"). Similarly, after the light from pump 230 propagates through amplifying fiber segment 270, a portion of the pump light signal still remains. WDM coupler 215 is disposed between amplifying segment 260 and output port 285. WDM coupler 225 is disposed between input port 290 and amplifying fiber segment 270. The pump feed-through signal from pump source 220 is supplied to fiber segment 270 via couplers 215, 225 and bi-directional connection 235. This feed-through signal pumps amplifying fiber segment 270 in a co-propagating manner as shown by directional arrow 261. Thus, amplifying fiber segment 270 is pumped twice, once from its primary pump 230 in a counter propagating direction and once from the pump feed-through signal from pump source 220 via fiber segment 260 and couplers 215 and 225.

Similarly, the pump feed-through signal from pump source 230 is supplied to fiber segment 260 via couplers 225, 215 and bi-directional connection 235. This feed-through signal pumps amplifying fiber segment 260 in a counter-propagating manner as shown by directional arrow 262. Thus, amplifying fiber segment 260 is pumped twice, once from its primary pump 220 in a co-propagating direction and once from the pump feed-through signal from pump source 230 via fiber segment 270 and couplers 225 and 215 in a counter propagating direction.

If one of the pump sources 220 or 230 should fail, each fiber segment 260 and 270 would still receive pump light from the remaining functioning pump either directly or from a pump feed-through signal. For example, if pump 230 fails, amplifying fiber segment 260 is pumped by pump 220 directly, and fiber segment 270 is pumped by the feed-through signal from pump source 220 via couplers 215, 225 and bi-directional connection 235. Similarly, if pump 220 fails, amplifying fiber segment 270 is pumped directly by pump 230 and fiber segment 260 is pumped by the remaining feed-through signal from pump 230 via couplers 225, 215 and bi-directional connection 235.

When this configuration is used in post-amplifier applications, the amplifiers are not highly inverted and less pump feed-through light is available that can be used to pump the second fiber segment in case the first fiber segment pump fails. For example, if pump 220 fails, pump 230 will pump fiber segment 270 and the feed-through light will pump segment 260. However, because in post amplifier applications, the amplifiers are not highly inverted, less pump feed-through light from segment 270 is available to pump segment 260. In this situation, higher pump feed-through light needs to be obtained. This may be done by using shorter lengths of fiber segments 260, 270 so sufficient pump feed-through light is present, using higher pump powers to increase feed-through or employing feedback circuitry to increase the power of a remaining operating pump source to compensate for a failed pump.

What is claimed is:

1. A fault tolerant optical amplifier apparatus for amplifying transmission signals, said apparatus comprising:
   a first amplifying fiber segment having first and second ends, a first set of said transmission signals propagating through said first fiber segment;
   a first directional coupler coupled to said first end of said first amplifying fiber segment;
   a first optical pump source coupled to said first directional coupler, said pump source supplying pump to said first amplifying fiber segment such that a portion of said pump power remains after propagation through said first amplifying fiber segment;
   a second amplifying fiber segment having a first and second ends, a second set of said transmission signals propagating through said second fiber segment, said second set of said transmission signals being different from said first set of said transmission signals;
   a second directional coupler coupled to said first end of said second amplifying fiber segment;
   a second optical pump source coupled to said second directional coupler, said pump source supplying pump power to said second amplifying fiber segment;
   a third directional coupler coupled to said second end of said first amplifying fiber segment;
   a fourth directional coupler coupled to said second end of said second amplifying fiber segment;
   a bi-directional optical connection disposed between said third and fourth couplers, such that said portion of pump power remaining after propagation through said first amplifying fiber segment is supplied to said second amplifying fiber segment via said third coupler, said bi-directional connection and said fourth coupler; and
   a feed back circuit communicating with said first pump source and said second pump source, said feedback circuit generating a feedback signal to adjust the power output associated with one of said first pump source and said second pump source when the other of said first pump source and said second pump source fails.

2. The apparatus in accordance with claim 1 wherein a portion of said pump power supplied to said second amplifying fiber segment remains after propagation through said second amplifying fiber segment, said portion of said remaining pump power supplied to said first amplifying fiber segment via said third coupler, said bi-directional connection and said fourth coupler.

3. The apparatus in accordance with claim 2, wherein said portion of said remaining pump power is supplied to said first amplifying fiber in a co-propagating direction with respect to the propagation of said first set of said transmission signals through said first amplifying fiber segment.

4. The apparatus in accordance with claim 2, wherein said portion of said remaining pump power is supplied to said first amplifying fiber in a counter propagating direction with respect to the propagation of said first set of said transmission signals through said first amplifying fiber segment.

5. The apparatus in accordance with claim 1, wherein said first pump source supplies said pump power to said first amplifying fiber segment in a co-propagating direction with respect to the propagation of said first set of said transmission signals through said first amplifying fiber segment.

6. The apparatus in accordance with claim 1, wherein said first pump source supplies said pump power to said first amplifying fiber segment in a counter propagating direction with respect to the propagation of said first set of said transmission signals through said first amplifying fiber segment.

7. The apparatus in accordance with claim 1, wherein said second pump source supplies said pump power to said second amplifying fiber segment in a co-propagating direction with respect to the propagation of said second set of said transmission signals through said second amplifying fiber segment.

8. The apparatus in accordance with claim 1, wherein said second pump source supplies said pump power to said second amplifying fiber segment in a counter propagating direction with respect to the propagation of said second set of said transmission signals through said second amplifying fiber segment.

9. The apparatus in accordance with claim 1, wherein said portion of said remaining pump power is supplied to said second amplifying fiber in a co-propagating direction with respect to the propagation of said second set of said transmission signals.

10. The apparatus in accordance with claim 1, wherein said portion of said remaining pump power is supplied to said second amplifying fiber in a counter propagating direction with respect to the propagation of said second set of said transmission signals.

11. A method for providing pump power to an optical amplifier apparatus for amplifying first and second sets of optical transmission signals, said method comprising the steps of:
   providing a first pump signal to a first amplifying fiber segment;
   providing a second pump signal to a second amplifying fiber segment;
   directing said first set of transmission signals through said first amplifying fiber segment, wherein said first pump signal propagates through said first amplifying fiber segment in a co-propagating direction with respect to said first set of transmission signals;
   directing said second set of transmission signals through said second amplifying fiber segment, said second set of transmission signals being different from said first set to transmission signals, wherein said second pump signal propagates through said second amplifying fiber segment in a counter-propagating direction with respect to said second set of transmission signals;
   directing a portion of said first pump signal to said second amplifying fiber segment after said first pump signal propagates through said first amplifying fiber segment; and
   directing a portion of said second pump signal to said first amplifying fiber segment after said second pump signal propagates through said second amplifying fiber segment.

* * * * *